(12) United States Patent
Nash et al.

(10) Patent No.: US 10,277,889 B2
(45) Date of Patent: Apr. 30, 2019

(54) METHOD AND SYSTEM FOR DEPTH ESTIMATION BASED UPON OBJECT MAGNIFICATION

(71) Applicant: QUALCOMM Incorporated, San Diego, CA (US)

(72) Inventors: James Wilson Nash, San Diego, CA (US); Venkata Ravi Kiran Dayana, San Diego, CA (US); Kalin Mitkov Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 15/456,275

(22) Filed: Mar. 10, 2017

(65) Prior Publication Data

US 2018/0184070 A1   Jun. 28, 2018

Related U.S. Application Data

(60) Provisional application No. 62/439,400, filed on Dec. 27, 2016.

(51) Int. Cl.
   *G06T 7/571*   (2017.01)
   *H04N 13/271*  (2018.01)
   *H04N 13/236*  (2018.01)
   *G06T 7/593*   (2017.01)
   *H04N 5/232*   (2006.01)

(52) U.S. Cl.
   CPC .......... *H04N 13/271* (2018.05); *G06T 7/571* (2017.01); *G06T 7/593* (2017.01); *H04N 5/23212* (2013.01); *H04N 5/23296* (2013.01); *H04N 13/236* (2018.05); *G06T 2207/10012* (2013.01)

(58) Field of Classification Search
   CPC .. G06T 7/50; G06T 7/55; G06T 7/571; G06T 7/593; G06T 7/596; H04N 13/271
   See application file for complete search history.

(56) References Cited

U.S. PATENT DOCUMENTS

| | | | |
|---|---|---|---|
| 2007/0036427 A1 | 2/2007 | Nakamura et al. | |
| 2007/0040924 A1 | 2/2007 | Cho I et al. | |
| 2007/0297784 A1* | 12/2007 | Wong | G03B 3/02 396/89 |
| 2008/0080852 A1 | 4/2008 | Chen et al. | |
| 2009/0167923 A1 | 7/2009 | Safaee-Rad et al. | |
| 2009/0167930 A1* | 7/2009 | Safaee-Rad | G02B 7/38 348/347 |

(Continued)

*Primary Examiner* — James R Sheleheda
(74) *Attorney, Agent, or Firm* — Paradice and Li LLP

(57) ABSTRACT

Methods and apparatus for determining a depth of an object within a scene are provided. Image data of a scene can be captured using a lens configured to project an image of the scene onto an image sensor. The lens has a known focal length and is movable between at least a first lens position and a second lens position. A first image of the scene is captured with the lens at a first lens position, and a second image of the scene is captured with the lens at a second, different position. By measuring a first dimension of the object using the first image and a second dimension of the object using the second image, a depth of the object may be determined based upon a ratio of the first and second dimensions, the focal length of the lens, and a distance between the first and second lens positions.

20 Claims, 6 Drawing Sheets

(56) References Cited

U.S. PATENT DOCUMENTS

| | | | | |
|---|---|---|---|---|
| 2009/0268985 A1* | 10/2009 | Wong | G06K 9/209 | 382/299 |
| 2011/0142287 A1* | 6/2011 | Wong | G06T 7/571 | 382/106 |
| 2011/0249173 A1* | 10/2011 | Li | H04N 5/23212 | 348/349 |
| 2012/0050482 A1 | 3/2012 | Boross et al. | | |
| 2012/0200673 A1* | 8/2012 | Tagawa | G02B 7/365 | 348/46 |
| 2012/0242796 A1* | 9/2012 | Ciurea | H04N 5/232 | 348/46 |
| 2012/0293627 A1* | 11/2012 | Ishii | G06T 3/4007 | 348/46 |
| 2013/0182151 A1* | 7/2013 | Takagi | H04N 5/2621 | 348/240.99 |
| 2013/0266210 A1* | 10/2013 | Morgan-Mar | G06T 7/571 | 382/154 |
| 2014/0184748 A1* | 7/2014 | Gharib | G02B 3/0056 | 348/46 |
| 2014/0225991 A1* | 8/2014 | Lin | G02B 7/30 | 348/47 |
| 2015/0109514 A1* | 4/2015 | Komatsu | G02B 7/38 | 348/349 |
| 2015/0146994 A1* | 5/2015 | Arnison | G06T 7/571 | 382/254 |
| 2015/0227815 A1* | 8/2015 | Komatsu | G06T 7/571 | 382/106 |
| 2015/0279043 A1* | 10/2015 | Bakhtiari | G06K 9/4642 | 382/195 |
| 2015/0341560 A1* | 11/2015 | Ishihara | H04N 5/23264 | 348/208.11 |
| 2016/0163055 A1* | 6/2016 | Li | G06T 15/00 | 345/419 |
| 2016/0255334 A1* | 9/2016 | Wajs | G06T 7/571 | 382/154 |
| 2016/0321819 A1* | 11/2016 | Morgan-Mar | G06T 7/0069 | |
| 2017/0223334 A1* | 8/2017 | Nobayashi | H04N 13/257 | |
| 2017/0345176 A1* | 11/2017 | Choi | G06T 7/571 | |
| 2018/0130210 A1* | 5/2018 | Hall | G06T 7/11 | |

* cited by examiner

METHOD AND SYSTEM FOR DEPTH ESTIMATION BASED UPON OBJECT MAGNIFICATION

CROSS-REFERENCE TO RELATED APPLICATIONS

This application claims the benefit of U.S. Provisional Application No. 62/439,400, filed Dec. 27, 2016, which is hereby incorporated by reference under 37 CFR 1.57.

FIELD

This disclosure generally relates to image processing, and more particularly to depth map generation.

BACKGROUND

Depth maps may be used in many applications for capturing and generating three-dimensional information of a scene. In many systems, depth values of objects within the scene may be determined through the use of two cameras that are displaced by a known amount. By triangulating the images captured by the two different cameras, depth values may be calculated for various features of the scene captured by the cameras.

SUMMARY

The systems, methods and devices of this disclosure each have several innovative aspects, no single one of which is solely responsible for the desirable attributes disclosed herein.

In some embodiments, an apparatus for determining a depth of an object within a scene is provided. The apparatus may comprise an image sensor configured to capture image data of the scene. The apparatus may further comprise a lens configured to project an image of the scene onto the image sensor, the lens having a focal length and movable between at least a first lens position and a second lens position. The apparatus may further comprise at least one processor coupled to the image sensor. The at least one processor may be configured to capture a first image of the scene containing the object, wherein the lens is positioned at the first lens position. The at least one processor may be further configured to identify a first plurality of keypoints associated with the object in the captured first image. The at least one processor may be further configured to measure a first dimension of the object based upon the first plurality of identified keypoints and the captured first image. The at least one processor may be further configured to capture a second image of the scene containing the object, wherein the lens is positioned at the second lens position. The at least one processor may be further configured to identify a second plurality of a keypoints corresponding to the first plurality of keypoints associated with the object in the captured second image. The at least one processor may be further configured to measure a second dimension of the object, based upon the second plurality of identified keypoints and the captured second image. The at least one processor may be further configured to determine a depth of the object based upon the first and second lens positions, the first and second measured dimensions, and the focal length of the lens.

In some embodiments, a method for determining a depth of an object within a scene is provided. The method comprises capturing a first image of the scene containing the object using a lens configured to project an image of the scene onto an image sensor, wherein the lens is positioned at a first lens position. The method further comprises identifying a first plurality of keypoints associated with the object in the captured first image. The method further comprises measuring a first dimension of the object based upon the first plurality of identified keypoints and the captured first image. The method further comprises capturing a second image of the scene containing the object, wherein the lens is positioned at a second lens position different from the first lens position. The method further comprises identifying a second plurality of a keypoints corresponding to the first plurality of keypoints associated with the object in the captured second image. The method further comprises measuring a second dimension of the object, based upon the second plurality of identified keypoints and the captured second image. The method further comprises determining a depth of the object based upon the first and second lens positions, the first and second measured dimensions, and a focal length of the lens.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

The following detailed description is directed to certain specific embodiments of the disclosure. However, the aspects of the disclosure can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, mobile internet devices, security cameras, action cameras, drone cameras, automotive cameras, body cameras, head mounted cameras, etc. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

Camera System

Figure 1:
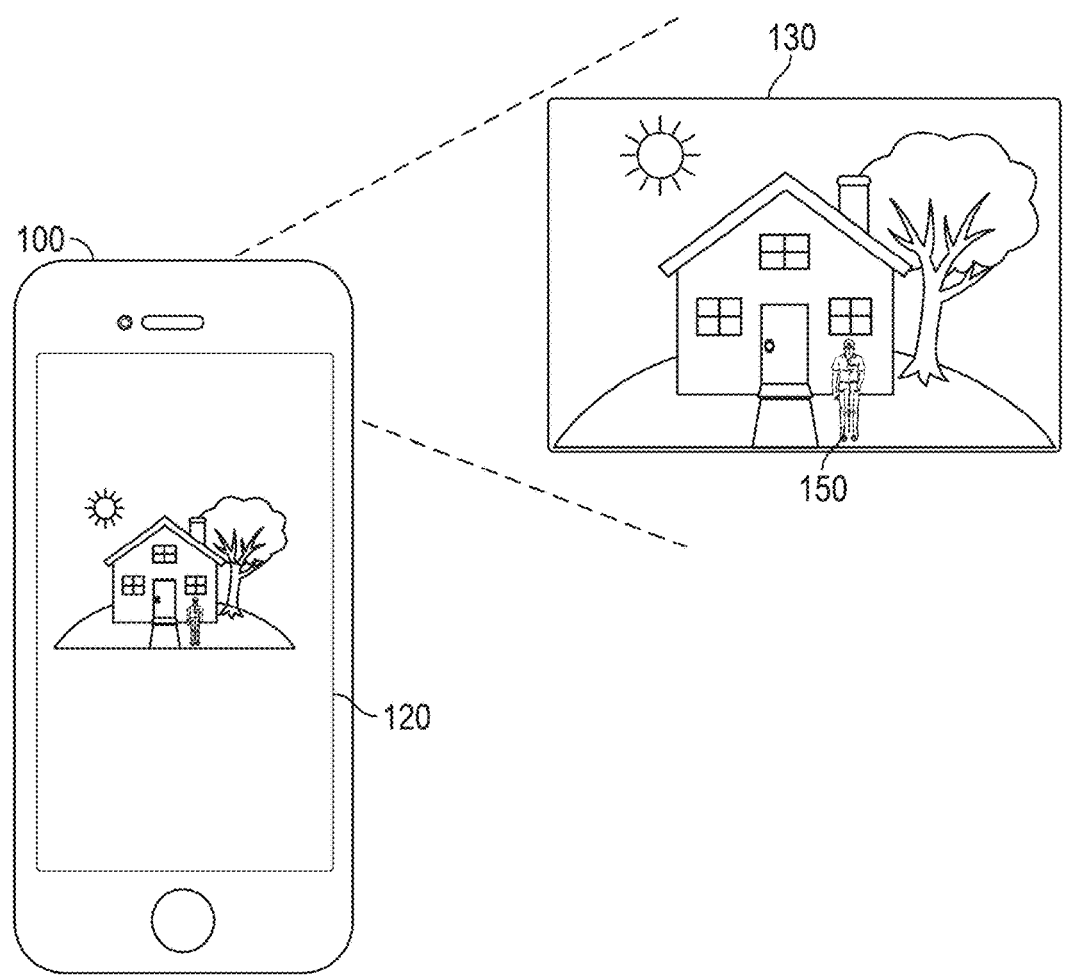
FIG. 1 illustrates an example of an apparatus (e.g., a mobile communication device) that includes an imaging system that can record images of a scene in accordance with aspects of this disclosure.

FIG. 1 illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1 shows an object 150 (e.g., a person) within the field of view 130 which may be captured by the camera. A processor within the apparatus 100 may perform various functions relating to the imaging device, which may include image capture functions (e.g., autofocus), image processing functions (e.g., saturation analysis, motion detection, and/or the like), etc. The apparatus 100 may comprise an imaging device or component as part of a system-on-chip (SoC). The SoC may include a central processing unit (CPU) that uses at least one RISC instruction set, and a single SoC may include multiple CPU cores, a graphics processing unit (GPU), a wireless modem, and other software and hardware to support a smartphone's global positioning system (GPS), camera, gesture recognition, and video capture and/or playback.

Figure 2:
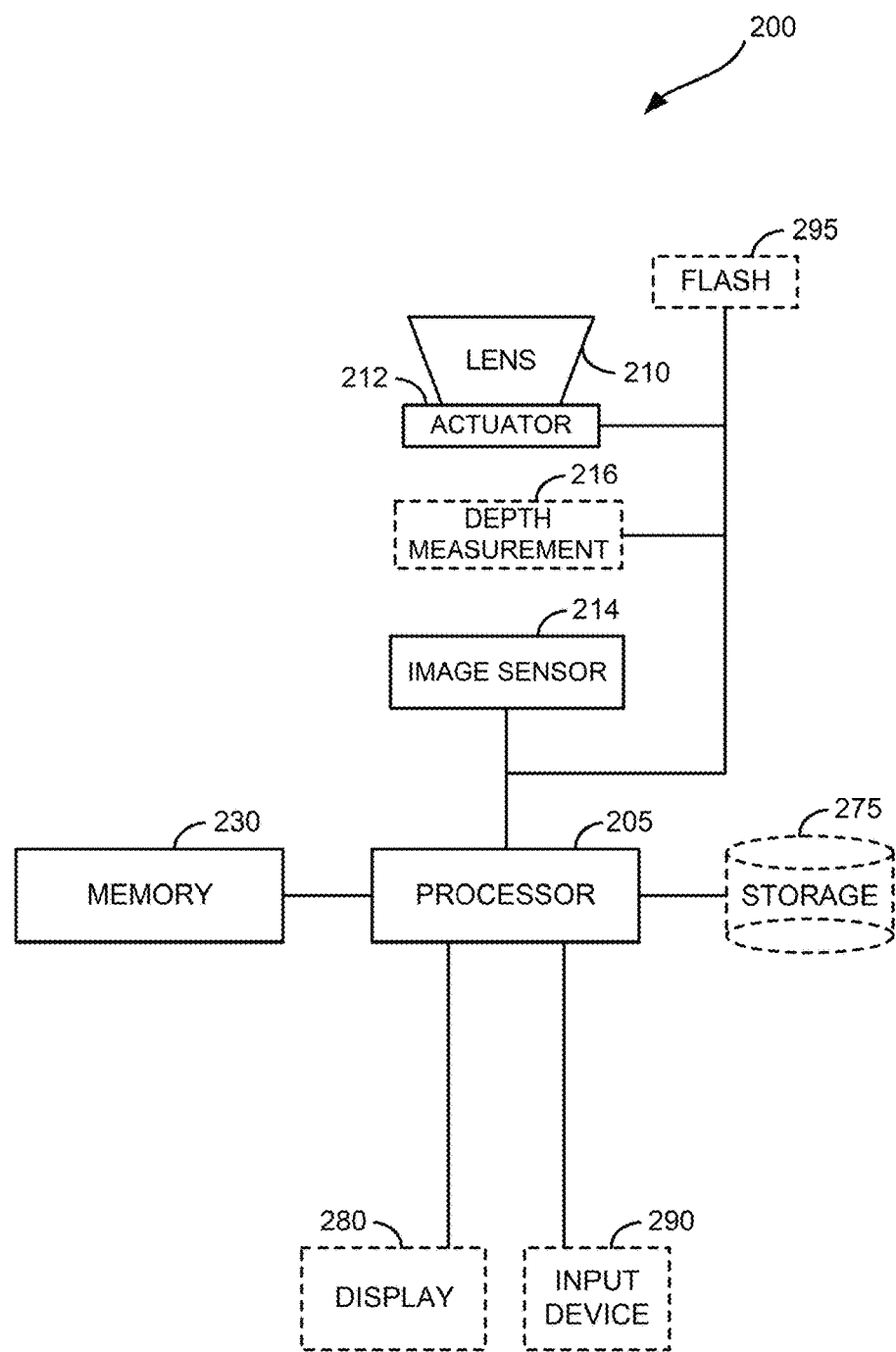
FIG. 2 depicts a block diagram illustrating an example of an imaging device in accordance with aspects of this disclosure.

FIG. 2 depicts a block diagram illustrating an example of an imaging device in accordance with aspects of this disclosure. The imaging device 200, also referred herein to interchangeably as a camera, may include a processor 205 operatively connected to an image sensor 214, a depth measurement integrated circuit (IC) 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200, such as performing HDR image processing.

In an illustrative embodiment, light enters the lens 210 and is focused on the image sensor 214. In some embodiments, the lens 210 is part of a system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may be used to focus the captured image. For example, the actuator 212 may be configured to move the lens 210 in a series of one or more lens movements to adjust the lens position to change the focus of an image.

The display 280 may be configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

In some embodiments, the depth measurement IC 216 may be used to perform depth analysis for measuring depths of one or more objects within a scene. The structure and operation of depth measurement IC 216 will be described in greater detail below in association with FIGS. 3-6. In some embodiments, one or more depth measurement functions may be performed by processor 205 instead of by depth measurement IC 216, or by a combination of depth measurement IC 216 and processor 205.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

The memory 230 may be considered a computer readable medium and stores instructions for instructing the processor 205 and/or depth measurement IC 216 to perform various functions in accordance with this disclosure. For example, in some aspects, memory 230 may be configured to store instructions that cause the processor 205 and/or depth measurement IC 216 to perform various methods, such as those as described below and as illustrated in FIGS. 3-6.

Depth Estimation Based on Lens Position

In some embodiments, a depth map or sparse depth map may be generated using a single camera (e.g., camera 200), instead of having to use two different cameras and triangulating the images captured by the two cameras. In some embodiments, single camera depth map generation may take advantage of image sensors having a resolution high enough to be able to accurately measure a dimension of objects (e.g., in pixels) within a captured scene. For example, in some embodiments a high resolution camera (e.g., 21 megapixels and up) may generate depth maps or sparse depth maps using a single camera. As used herein, the terms "depth map" and "sparse depth map" may refer to a map of depth values for a plurality of points within a captured image of the scene, and does not require depth information to be calculated for every point within the captured image.

Figure 3:
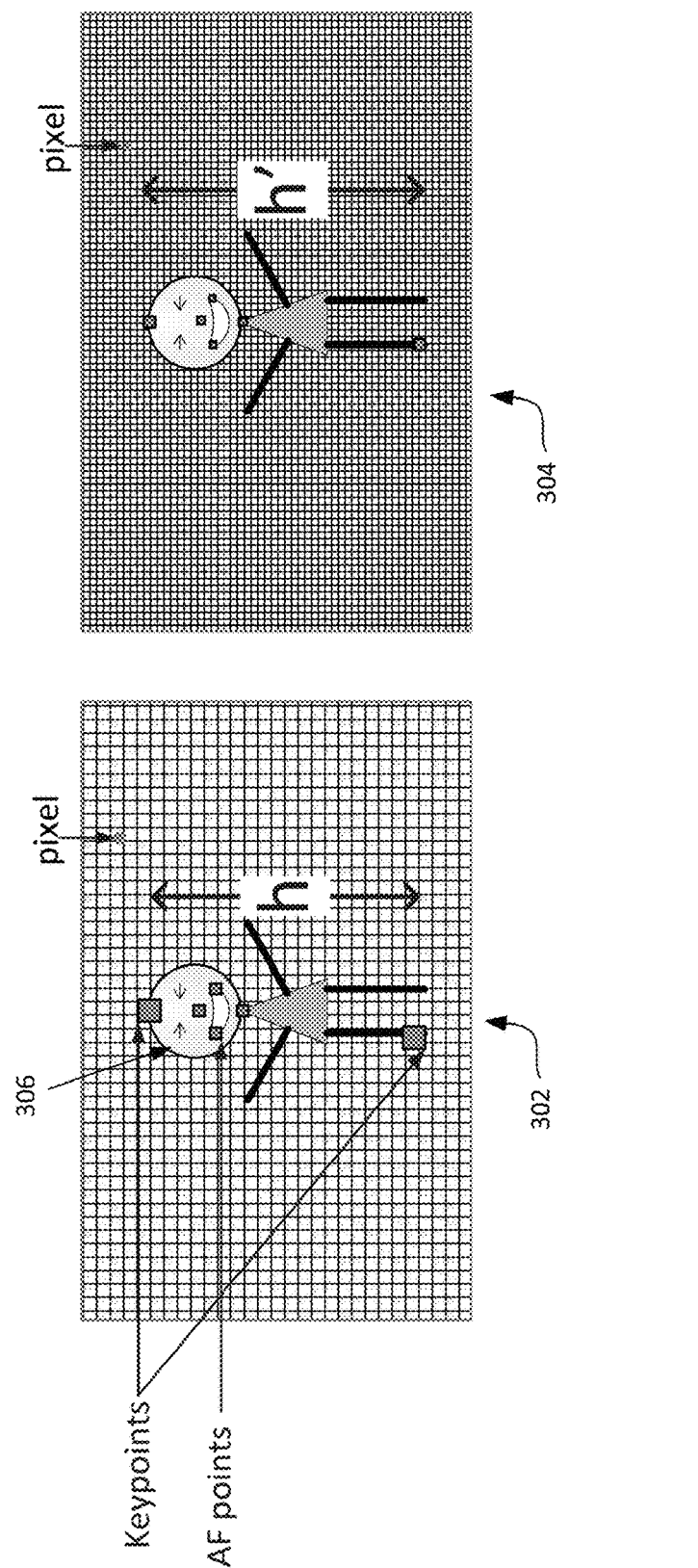
FIG. 3 illustrates captured images of a scene at different resolutions, in accordance with some embodiments.

Having a resolution that is sufficient enough to accurately calculate a pixel distance, e.g., a height, of an object in a captured scene may allow for accurate depth maps to be generated for a scene using a single camera. FIG. 3 illustrates captured images of a scene at different resolutions. The scene may include one or more objects, such as a person 306. Image 302 corresponds to an image captured by an image sensor at a first resolution, while image 304 may correspond to an image captured by an image sensor at a second resolution that is higher than the first resolution. As used herein, resolution generally refers to a number of pixels of image data that may be generated by an image sensor (e.g., a number of pixels over one or more dimensions that may be generated by the image sensor when capturing an image of a scene). For example, as illustrated in FIG. 3A, the image 304 has a higher resolution than the image 302, as the image 304 comprises a larger number of pixels of image data in comparison with the image 302.

Each of the captured images may contain one or more autofocus points and/or keypoints (also referred to as salient points). Autofocus points (or AF points) may refer to points used by a camera's autofocus function for performing autofocusing on captured images of a scene. In some embodiments, AF points may be automatically determined through the camera's autofocus function.

On the other hand, keypoints may refer to any points within a captured image associated with sufficient structure or features allowing for the point to be identified in different captured images over time and space. In some embodiments, keypoints may correspond to object edges, borders, or corners. In some embodiments, a user may define a keypoint, e.g., by touching a point of a captured image on a touchscreen, which may then be tracked in subsequent captured images. In some embodiments, keypoints may include AF points, or may include points on a captured image other than AF points.

Dimensions of objects within a captured image may be measured in pixels, based upon the AF points or keypoints associated with the object. For example, as illustrated in FIG. 3, person 306 may be associated with a first keypoint 308 corresponding to the top of their head, and a second keypoint 310 corresponding to their feet. The height of the person 306 can thus be measured by determining a number of vertical pixels between the first and second keypoints. Due to the higher resolution and smaller pixel sizes of image 304 in comparison to image 302, the height of person 306 measured in image 304 may be more accurate compared to the height measured in image 302. Thus, with increasing resolution of an image sensor, object dimensions measured in pixels may become more accurate.

In many cameras, the lens 210 projects an image of a scene onto the image sensor 214. The lens 210 may have a particular focal length, causing an object in the projected image to be in focus or out of focus, depending upon the depth of the object, the focal length of the lens 210, and the distance between the lens 210 and a plane of the image sensor 214.

Figure 4:
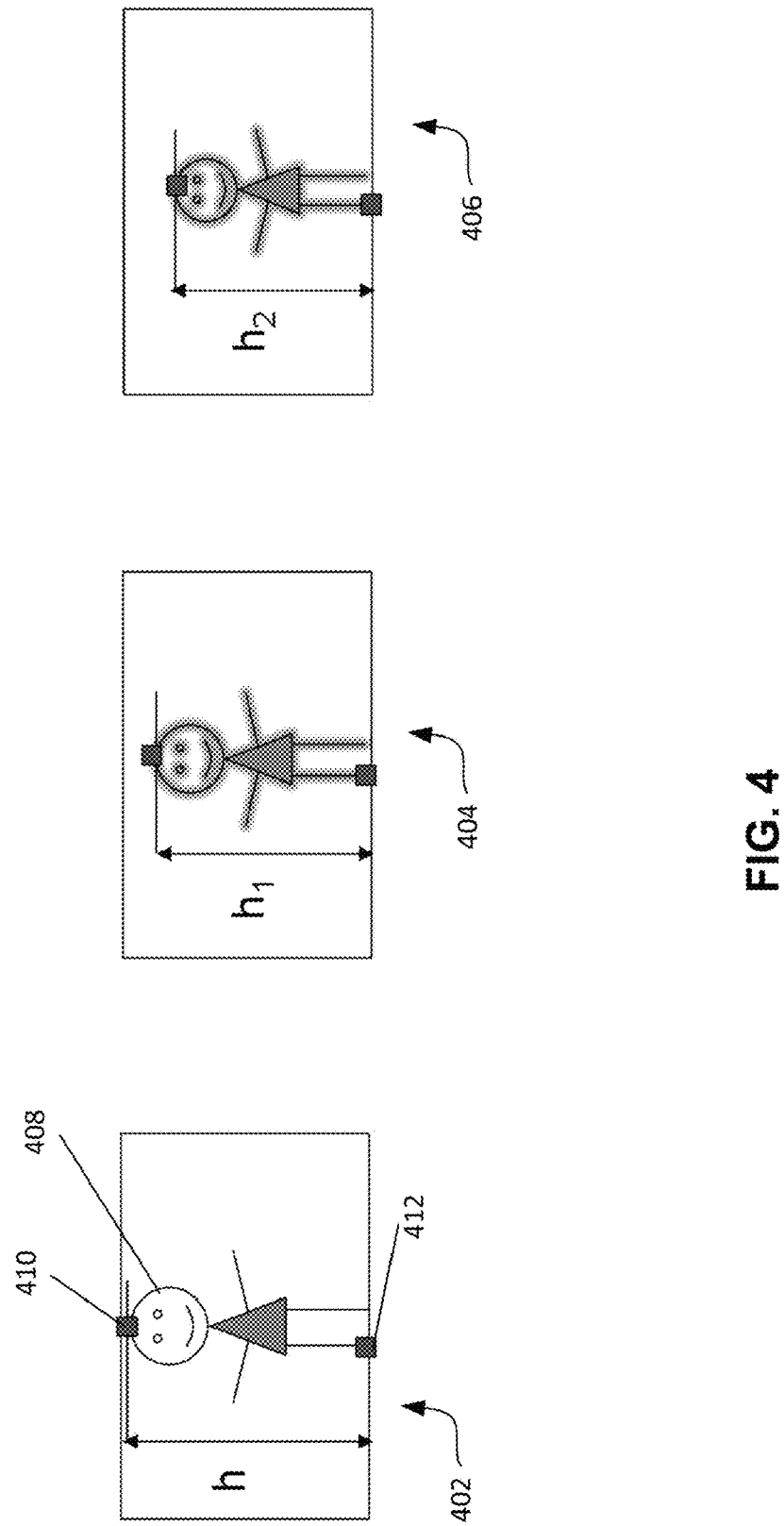
FIG. 4 illustrates different images of a scene that may be captured at different lens positions.

FIG. 4 illustrates different images of a scene that may be captured at different lens positions. For example, image 402 corresponds to an image captured of a scene (containing a person 408) using a first lens position. The first lens position corresponds to a position where the person 408 is in focus. From the captured image, a height h of the person 408 may be measured, based upon at least a first keypoint 410 and a second keypoint 412 associated with the person 408

On the other hand, images 404 and 406 correspond to images captured of the scene at different lens positions. Because the lens positions used to capture images 404 and 406 is different from the position where person 408 is in focus, person 408 may appear to be slightly unfocused in the images 404 and 406. However, keypoints 410 and 412 associated with person 408 may still be able to be identified and used to measure a height of person 408. In some embodiments, even if objects within the scene (e.g., person 408) are unfocused, interpolation may be used to determine the location of various structures or edges in the captured image to sub-pixel accuracy. Using keypoints 410 and 412, the height of person 408 may be measured in images 404 and 406 as $h_1$ and $h_2$, respectively.

In some embodiments, an autofocus function of the camera 200 may be used to determine a depth of objects within a scene. For example, the autofocus function of the camera 200 may, using the actuator 212, move the lens 210 between a plurality of different positions and determine a position where one or more autofocus points associated with the object are in focus. The camera 200 may then determine a depth based upon the determined position and the one or more autofocus points.

However, depth information measured using autofocus may be potentially inaccurate, as it may require a depth of field to be defined for each autofocus point. The range of depths associated with each autofocus point may need to be precisely calibrated in software in order to obtain an accurate depth measurement.

In some embodiments, the camera 200 may measure object depth based upon changes in magnification at different lens positions. For example, as illustrated in FIG. 4, different lens positions may correspond to different magnification levels, e.g., zoom. As such, the height of person 408 in each of the captured images 402, 404, and 406 may be different. By analyzing the differences between heights h, $h_1$, and $h_2$ at different lens positions, a depth of person 408 can be determined. Because the position of the lens 210 can be mechanically derived, an amount of processing and prior calibration needed to determine object depths within a scene can be reduced. In addition, while calculating depth using autofocus may require the lens to be swept over many different positions in order to determine at which positions different objects in the scene are in focus, determining depth based upon magnification changes at different lens positions may only require a small number of different lens positions. For example, in some embodiments, only two different lens positions may be used, wherein the two lens positions are far enough apart that a change in magnification between captured images associated with each lens position can be detected for different objects within the scene.

Figure 5:
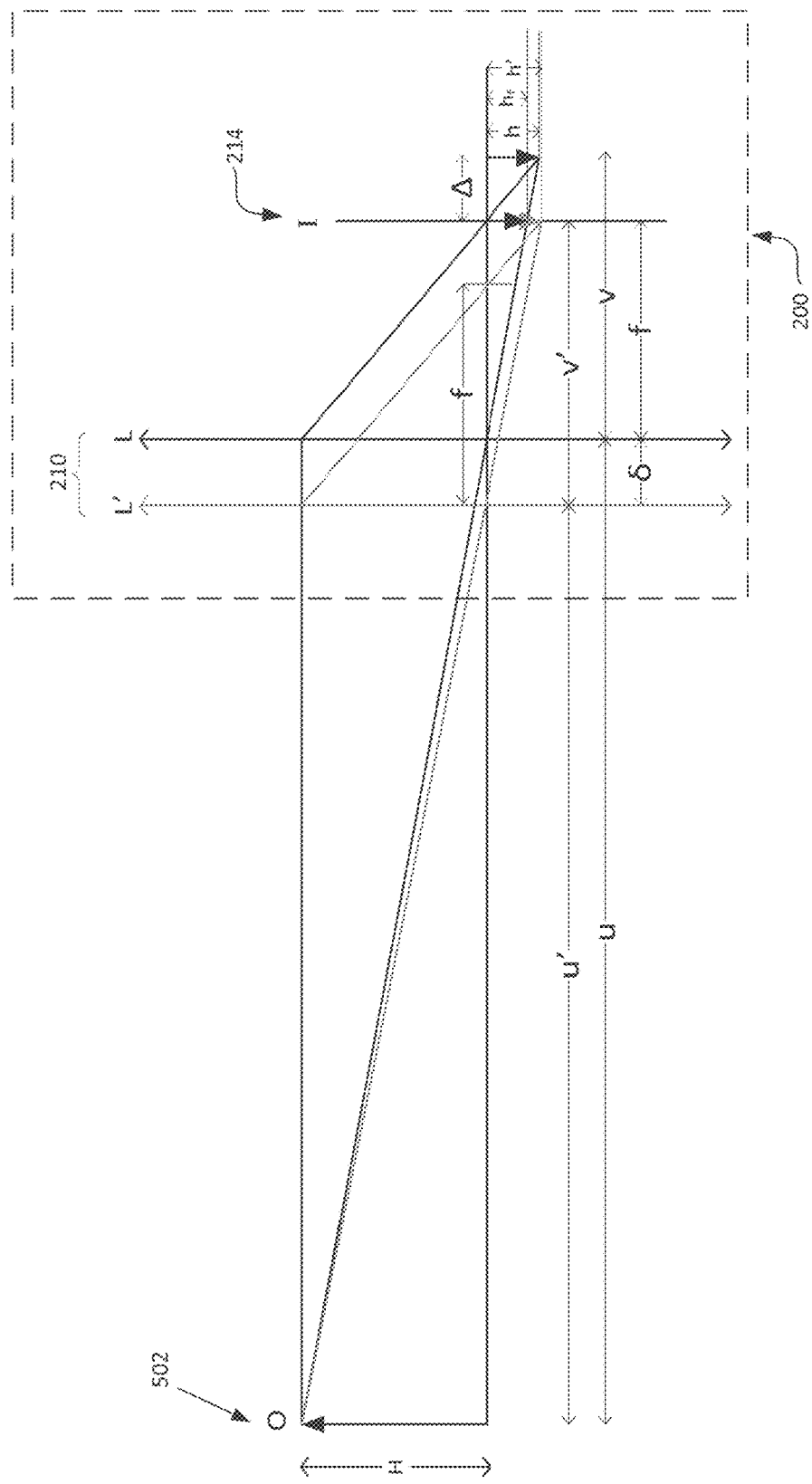
FIG. 5 illustrates a diagram showing optical characteristics at different lens positions, in accordance with some embodiments.

FIG. 5 illustrates a diagram showing optical characteristics at different lens positions, in accordance with some embodiments. An object O (such as a person) having a height of H may be located at location 502. The camera 200 having a lens 210 with a focal length of f may be used to capture images of a scene containing the object O. For example, the camera 200 may capture a first image at a first lens position L (located a distance u from object O), and a second image at a second lens position L' (located at a distance u' from object O). The positions L and L' may be separated by a distance δ. The lens 210 may be moved between the different positions (e.g., L and L') by an actuator 212 (not shown).

The lens 210 projects an image of object O a certain distance behind the lens 210, based upon the focal length f and the distance (u or u') between the object O and the lens 210. For example, when the lens 210 is at position L, the image of object O is projected a distance of v behind the lens 210, while when the lens 210 is at position L', the image of object O is projected a distance of v' behind the lens 210.

The image sensor 214 may be located at a plane I behind the lens. When the projection of object O by the lens 210 falls on the plane I, the image of the object O captured by the image sensor 214 will be in focus. For example, as illustrated in FIG. 5, the projected image of object O when the lens 210 is at position L' falls on the plane I of the image sensor 214, resulting in a captured image of object O that is in focus. From the captured image, a height h' of the object O can be measured in pixels.

On the other hand, the image of object O projected when the lens 210 is at position L may fall at a position other than plane I (e.g., a distance Δ behind plane I). As such, the image corresponding to lens position L may be slightly unfocused. However, as discussed above, a height $h_f$ of object O in pixels can still be measured even when the image is not completely in focus. For example, a height of $h_f$ of the object O can be measured in pixels from the captured image of object O when the lens 210 is at position L.

As illustrated in FIG. 5, a shift in lens position can cause a measurable difference in object magnification. This difference in magnification can be used to determine a depth of the object O (e.g., distance from the object O to the camera 200). The depth of the object O can be determined as a function of magnification change of the object O between a first lens position L and a second lens position L', a distance between the first and second lens positions δ, and a focal length f of the lens. In some embodiments, the at least first and second positions of the lens (e.g., at position L and L') may be known positions configured such that the distance between the positions (δ) is large enough that a measurable difference between object dimensions (e.g., h and $h_f$) can be detected, while small enough such that deviations of projected images from the plane of the sensor image (e.g., Δ) will not be significantly out of focus so that an object dimension can be accurately measured.

In some embodiments, the following equation may be used in some embodiments to determine a depth of an object within a scene.

$$\Delta M_f = \left(1 + \frac{\delta}{f}\right)\left(1 + \frac{\delta}{z}\right)$$

where $\Delta M_f$ corresponds to a ratio between the measured object heights at the different lens positions $$\left(e.g., \frac{h}{h_f}\right),$$

δ corresponds to a distance between the different lens positions, f corresponds to the focal length of the lens, and z corresponds to a depth of the object (e.g., distance of the object from the camera). Because f may be a known innate property of the lens, δ may be a known configurable parameter, and $\Delta M_f$ may be measured by capturing images of the object at the different lens positions, the depth of the object z can be determined can capturing images of the object at different known lens positions. As such, all parameters in the above equation except for depth of the object z are either measurable (e.g., object height ratio $\Delta M_f$) or known camera settings or properties (e.g., focal length f, lens shift distance δ), allowing for z to be determined.

A depth map of a scene can be generated by calculating depths for different objects (or portions of objects) within the scene. The lens 210 of the camera 200 can be positioned at a first known position and a second known position. The camera 200 may measure dimensions of various objects in the scene in pixels at each of the first and second known lens positions, which may be used to calculate depths for each object in the scene and to generate the depth map. In some embodiments, the positions of the lens 210 may be configured such that at least one of the first and second known lens positions corresponds to a lens position where at least one of the objects within the scene is in focus. In some embodiments, the camera 200 may continuously update the depth map of the scene (e.g., as objects move in the scene, as the position of the camera 200 within the scene moves, and/or the like) by continuing to position the lens 210 between the at least two different known positions and using the resulting magnification changes to calculate updated depths for objects in the scene. In some embodiments, different lens positions may be used for different objects in the scene. For example, in some embodiments, at least one lens position may correspond to a position where the object is substantially in focus.

Figure 6:
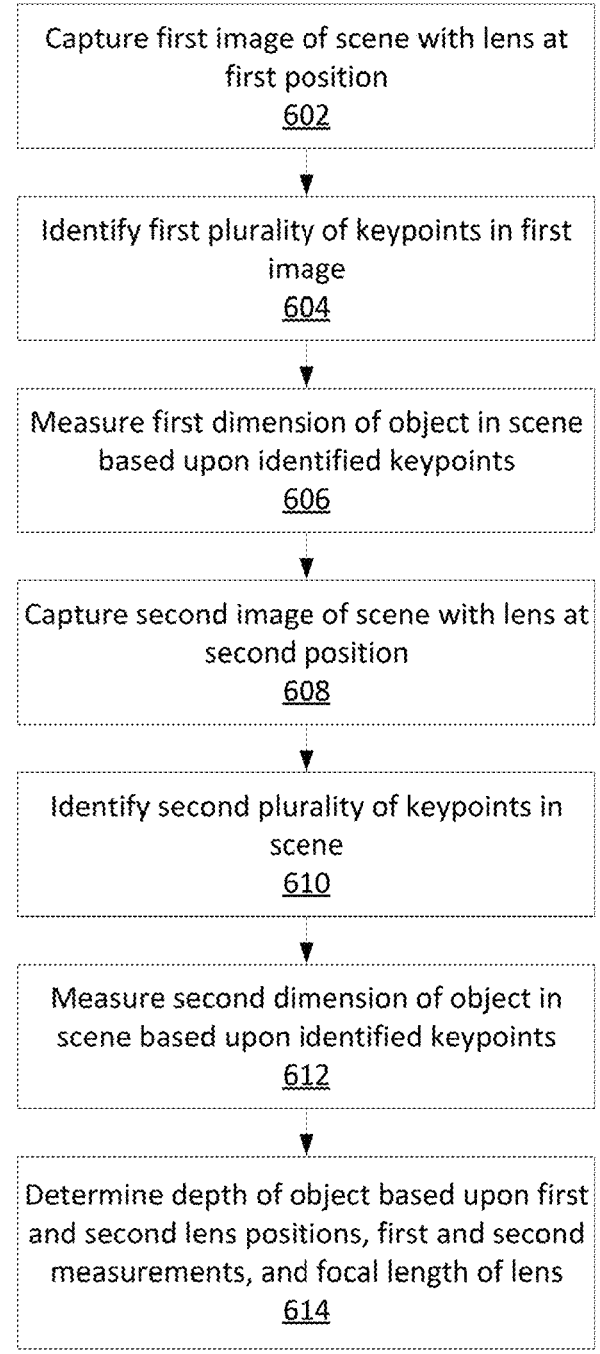
FIG. 6 illustrates a flowchart of a process for determining a depth of an object in a scene, in accordance with some embodiments.

FIG. 6 illustrates a flowchart of a process for determining a depth of an object in a scene, in accordance with some embodiments. At block 602, the camera 200 captures a first image of the scene containing the object, wherein the lens 210 is at a first position. In some embodiments, the first position may correspond to a position where the object is in focus (e.g., the projected image of the object by the lens 210 falls on a plane of an image sensor 214 of the camera 200).

At block 604, the camera 200 (e.g., using depth measurement IC 216 and/or processor 205) determines a first plurality of keypoints associated with the object in the first image. The plurality of keypoints may correspond to any points associated with the object that can be tracked over different captured images of the object. In some embodiments, at least some of the first plurality of keypoints may be determined automatically, e.g., through the camera 200's autofocus function. In some embodiments, a user may select one or more keypoints to be associated with the object (e.g., on a display displaying the captured imaged to the user). The plurality of keypoints may be selected to correspond to a dimension of the object (e.g., height or width of the object).

At block 606, the camera 200 measures a first dimension of the object using the captured first image, based upon the first plurality of keypoints. The first dimension may correspond to a height or width of the object. In some embodiments, the first dimension may correspond to a distance in pixels between a first keypoint and a second keypoint of the first plurality of keypoints associated with the object.

At block 608, the camera 200 captures a second image of the scene containing the object, where the lens 210 is positioned at a second position located a known distance from the first position. At block 610, the camera 200 determines a second plurality of keypoints associated with the object in the second image. The second plurality of keypoints in the second image may correspond to the first plurality of keypoints in the first image. In some embodiments, the second plurality of keypoints in the second image may be identified automatically by the camera 200 (e.g., using depth measurement IC 216 and/or processor 205) based upon the first plurality of keypoints in the first image.

At block 612, the camera 200 measures a second dimension of the object using the captured second image, based upon the plurality of keypoints. In some embodiments, the second dimension may correspond to the same dimension as the first dimension. For example, where the measurement of the first dimension may correspond to a distance between a first and second keypoint in the first image, the measurement of the second dimension may correspond to a distance between the corresponding first and second keypoints as captured in the second image.

At block 614, the camera 200 may determine a depth of the object in the scene, based upon the known locations of the first and second lens positions, the first and second measurements, and a known focal length of the lens 210. For example, a lens shift distance between the first and second lens positions may be known or calculated from the first and second lens positions. The first and second measurements may be compared to determine a magnification ratio between the first and second lens positions. The lens shift distance, magnification ratio, and lens focal length may be used to determine the depth of the object. In some embodiments, the depth of the object may be used to generate a depth map or a sparse depth map of the scene.

By capturing images of a scene at different lens positions to determine object depths, the depth of various objects in the scene can be accurately measured by taking advantage of the optical properties of the lens and known camera settings such as shift in lens positions. For example, the mechanical position of the lens in the camera may be determined. In addition, with the use of high resolution image sensors, dimensions of objects in captured images can be accurately measured in pixels, allowing for accurate magnification ratios to be determined for a pair of different lens positions. If the focal length of the lens is known, the magnification ratio and distance between lens positions can used to determine the depth of the object. As such, the depth of the object can be determined based upon mechanical positions and optics, without the need for significant, or in some embodiments any, prior depth range calibration that may be needed in many autofocus based depth calculation applications.

Although the above discussion refers primarily to determining object depths using a single camera with a lens having a known focal length and using known lens positions, it is understood that in some embodiments, object depth determination may be performed using multiple cameras. For example, in some embodiments, a camera system usable for object depth determination may comprise at least two cameras, including at least a first camera and a second camera. In some embodiments, the second camera may determine a depth of the object within the scene in order to confirm or refine an object depth determination of the first camera, which may be applied to, for example, improve accuracy and/or speed of an autofocus operation.

In some embodiments, the at least two cameras may comprise cameras having different lens focal lengths. In some embodiments, the camera system may make a determination as to which camera to use to determine a depth of an object in the scene, based on the respective focal lengths of the cameras, a distribution of keypoints associated with the object, a size of the object in a captured image of the scene, and/or the like. For example, the first camera may comprise a wide angle lens (e.g., focal length of less than 35 mm), while the second camera may comprise a telephoto lens (e.g., focal length of greater than 70 mm). In some embodiments, instead of or in addition to moving the lens of a camera between different lens positions to determine the depth of the object, images of the scene may be captured using different lens of different focal lengths at a known lens position in order to determine the depth of the object.

In some embodiments, the determined depth information may be used to automatically set an autofocus lens position of a camera to focus on a particular object within a scene. For example, in some embodiments, depth estimation may be used in conjunction with one or more image processing functions of a camera, such as facial recognition, to allow for the camera to automatically adjust a lens position to focus on one or more desired objects within the scene (e.g., one or more people within the scene). In some embodiments, the imaging device 200 described herein may correspond to a digital camera or camera phone.

In some embodiments, the determined depth information may be used to generate a depth map or a sparse depth map. For example, the imaging device 200 may correspond to a camera that may be used to determine depths of multiple objects within a scene and use the determined depths to generate a sparse depth map of the scene. In some embodiments, the sparse depth map may be used for three-dimensional modeling of the scene. In some embodiments, the imaging device 200 may be mounted on a drone or vehicle, wherein a generated sparse depth map may be usable for navigating the drone or vehicle (e.g., by determining the distances of various objects relative to the vehicle in order to navigate the vehicle to avoid collisions with surrounding objects).

OTHER CONSIDERATIONS

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for determining a depth of an object within a scene, the apparatus comprising:
   an image sensor configured to capture image data of the scene;
   a lens configured to project an image of the scene onto the image sensor, the lens being movable between at least a first lens position and a second lens position;
   one or more processors; and
   a memory storing instructions that, when executed by the one or more processors, cause the apparatus to:
   capture a first image of the scene containing the object when the lens is positioned at the first lens position;
   select a first plurality of keypoints associated with the object in the captured first image, wherein at least two of the first plurality of keypoints are indicative of a first height of the object or a first width of the object;
   determine a first dimension of the object based at least in part on the first plurality of selected keypoints;
   capture a second image of the scene containing the object when the lens is positioned at the second lens position;
   select a second plurality of keypoints associated with the object in the captured second image and corresponding to respective ones of the first plurality of keypoints, wherein at least two of the second plurality of keypoints are indicative of a second height of the object or a second width of the object;
   determine a second dimension of the object based at least in part on the second plurality of selected keypoints; and
   determine the depth of the object based at least in part on a first focal length of the lens in the first lens position, a second focal length of the lens in the second lens position, the first dimension of the object, and the second dimension of the object.

2. The apparatus of claim 1, wherein the first dimension of the object and the second dimension of the object correspond to pixel distance.

3. The apparatus of claim 1, wherein the first lens position corresponds to a position in which the object in the first captured image is in focus.

4. The apparatus of claim 1, wherein the first dimension of the object corresponds to a pixel distance between a first keypoint of the first plurality of keypoints and a second keypoint of the first plurality of keypoints in the first image.

5. The apparatus of claim 4, wherein the second dimension of the object corresponds to a pixel distance between a first keypoint of the second plurality of keypoints and a second keypoint of the second plurality of keypoints in the second image, wherein the first and second keypoints of the second plurality of keypoints correspond to the first and second keypoints of the first plurality of keypoints, respectively.

6. The apparatus of claim 1, wherein the first plurality of keypoints comprises one or more autofocus points.

7. The apparatus of claim 1, further comprising a display indicating one or more locations of one or more of the first plurality of keypoints in the first image.

8. The apparatus of claim 1, wherein the second plurality of keypoints are identified in the second image based at least in part on the first plurality of keypoints in the first image.

9. The apparatus of claim 1, wherein the depth of the object is determined at least in part by a magnification ratio of the first focal length and the second focal length.

10. The apparatus of claim 1, wherein execution of the instruction causes the one or more processors to generate a sparse depth map of the scene using at least the determined depth of the object.

11. A method for determining a depth of an object within a scene, comprising:
   capturing a first image of the scene containing the object using a lens configured to project an image of the scene onto an image sensor when the lens is positioned at a first lens position;
   selecting a first plurality of keypoints associated with the object in the captured first image, wherein at least two of the first plurality of keypoints are indicative of a first height of the object or a first width of the object;
   determining a first dimension of the object based at least in part on the first plurality of selected keypoints;
   capturing a second image of the scene containing the object when the lens is positioned at a second lens position;
   selecting a second plurality of keypoints associated with the object in the captured second image and corresponding to respective ones of the first plurality of keypoints, where at least two of the second plurality of keypoints are indicative of a second height of the object or a second width of the object;
   determining a second dimension of the object based at least in part on the second plurality of selected keypoints; and
   determining the depth of the object based at least in part on a first focal length of the lens in the first lens position, a second focal length of the lens in the second lens position, the first dimension of the object, and the second dimension of the object.

12. The method of claim 11, wherein the first dimension of the object and the second dimension of the object correspond to pixel distances.

13. The method of claim 11, wherein the first lens position corresponds to a position in which the object in the first captured image is in focus.

14. The method of claim 11, wherein the first dimension corresponds to a pixel distance between a first keypoint of the first plurality of keypoints and a second keypoint of the first plurality of keypoints in the first image.

15. The method of claim 14, wherein the second dimension of the object corresponds to a pixel distance between a first keypoint of the second plurality of keypoints and a second keypoint of the second plurality of keypoints in the second image, wherein the first and second keypoints of the second plurality of keypoints correspond to the first and second keypoints of the first plurality of keypoints, respectively.

16. The method of claim 11, wherein the first plurality of keypoints comprises one or more autofocus points.

17. The method of claim 11, further comprising displaying indications of one or more locations of one of more of the first plurality of keypoints.

18. The method of claim 11, further comprising identifying the second plurality of keypoints in the second image based at least in part on the first plurality of keypoints.

19. The method of claim 11, wherein the depth of the object is determined at least in part on a magnification ratio of the first focal length and the second focal length.

20. The method of claim 11, further comprising generating a sparse depth map of the scene using at least the depth of the object.

* * * * *